(12) United States Patent
Mayer

(10) Patent No.: US 12,060,957 B2
(45) Date of Patent: Aug. 13, 2024

(54) DEVICE FOR CONNECTING FLUID-CONDUCTING PIPES AND/OR CHAMBERS

(71) Applicant: VAT Holding AG, Haag (CH)

(72) Inventor: Thomas Mayer, Hohenems (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/767,974

(22) PCT Filed: Nov. 16, 2020

(86) PCT No.: PCT/EP2020/082188
§ 371 (c)(1),
(2) Date: Apr. 11, 2022

(87) PCT Pub. No.: WO2021/110393
PCT Pub. Date: Jun. 10, 2021

(65) Prior Publication Data
US 2024/0093814 A1 Mar. 21, 2024

(30) Foreign Application Priority Data
Dec. 3, 2019 (DE) .......................... 102019132862.4

(51) Int. Cl.
*F16L 27/11* (2006.01)
*F16L 25/01* (2006.01)
*F16L 51/02* (2006.01)

(52) U.S. Cl.
CPC .............. *F16L 27/11* (2013.01); *F16L 25/01* (2013.01); *F16L 51/025* (2013.01)

(58) Field of Classification Search
CPC ........... F16L 27/11; F16L 51/025; F16L 25/01
See application file for complete search history.

(56) References Cited

U.S. PATENT DOCUMENTS 1,505,121 A 8/1924 Allport
5,145,215 A 9/1992 Udell
(Continued)

FOREIGN PATENT DOCUMENTS

CH 677012 3/1991
DE 102014208176 11/2015
(Continued)

OTHER PUBLICATIONS

Valve Assembly Drawing, Admitted prior art, dated Apr. 12, 2010.
(Continued)

*Primary Examiner* — Zachary T Dragicevich
(74) *Attorney, Agent, or Firm* — Volpe Koenig

(57) ABSTRACT

A device (1) for connecting fluid-conducting lines (2) and/or chambers (3) in a high-frequency electromagnetic field. The device includes two line bodies (4, 6) each having a line body inner wall (5, 7), which is rigid per se, and a bellows (8). The line body inner walls together enclose an inner cavity (9) for the passage of fluid through the device, and the line bodies are connected to one another, and enclosed with a sealing action, by the bellows and the first and second line bodies can be displaced and/or tilted relative to one another. The second line body inner wall projects a little into an interior space (10) surrounded by the first line body inner wall and ends there and the first line body inner wall is electrically conductively connected to the second line body inner wall by at least one elastically deformable sliding contact (11).

12 Claims, 3 Drawing Sheets

(56) References Cited

U.S. PATENT DOCUMENTS

| | | | | |
|---|---|---|---|---|
| 5,971,439 A | * | 10/1999 | Cwik | .................. F16L 27/11 |
| 9,121,515 B2 | | 9/2015 | Yamamoto et al. | |
| 2009/0102187 A1 | * | 4/2009 | Carns | .................. F16L 25/01 |
| 2017/0279205 A1 | | 9/2017 | Goirand et al. | |

FOREIGN PATENT DOCUMENTS

| | | | | |
|---|---|---|---|---|
| DE | 102014225591 | | 6/2016 | |
| JP | H02210800 | | 8/1990 | |
| JP | 3101173 | | 2/2004 | |
| JP | H11339999 | | 12/2019 | |
| KR | 20220145505 A | * | 4/2021 | .............. F16L 27/11 |

OTHER PUBLICATIONS

Valve Assembly Drawing 2, Admitted prior art, dated Jun. 30, 2003.
Valve Assembly Drawing 3, Admitted prior art, dated Jun. 11, 2012.
RF Passage Drawing, Admitted prior art, dated Jan. 23, 2019.

* cited by examiner

DEVICE FOR CONNECTING FLUID-CONDUCTING PIPES AND/OR CHAMBERS

TECHNICAL FIELD

The present invention relates to a device for connecting fluid-conducting lines and/or chambers in a high-frequency electromagnetic field, wherein the device comprises a first line body with a first line body inner wall, which is rigid per se, and a second line body with a second line body inner wall, which is rigid per se, and a bellows, in particular an elastically deformable bellows, wherein the first line body inner wall and the second line body inner wall together enclose an inner cavity for the passage of fluid through the device, and the first line body and the second line body are connected to one another by the bellows, wherein at least in certain regions the bellows encloses the first line body and the second line body with a sealing action toward the outside, and the first line body and the second line body can be displaced and/or tilted relative to one another, in particular counter to an elastic pretension of the bellows.

BACKGROUND

In an environment with high-frequency electromagnetic fields, such as a particle accelerator, for example, in the case of connections between fluid-conducting lines and/or chambers care must be taken that the high-frequency electromagnetic fields which are internal and/or external to the lines and/or chambers are disrupted as little as possible. Furthermore, when the lines and/or chambers are being connected to one another, it must be possible to a certain extent to correct lengths and/or angles when the lines and/or chambers are joined together. Various approaches for this are known in the prior art. For example, JP 3101173 U discloses a device of the generic type, wherein the line body inner walls of the first and the second line body of the device are arranged at a distance from one another and are connected to one another by means of an encircling spring body having individual resilient fingers. The resilient fingers ensure an electrical connection between the two line bodies and allow a certain degree of compensation of lengths and/or angles when the lines and/or chambers are being assembled.

JP 11-339999 discloses a solution in which the lines to be connected to one another each comprise flanges which are connected directly to one another with the interposition of seals. The seals allow a certain degree of compensation of angles and lengths when the flanges are being connected. Within the flanges, the lines are in turn connected to one another by means of electrically conductive, resilient fingers. The fingers act as sliding contacts.

SUMMARY

The object of the invention is to provide a device of the type mentioned above, which permits compensation of angles and/or lengths when lines and/or chambers are being connected and disrupts internal and/or external high-frequency electromagnetic fields as little as possible.

To this end, the invention proposes a device having one or more of the features disclosed herein.

It is therefore provided that the second line body inner wall of the second line body projects a little into an interior space surrounded by the first line body inner wall and ends there and the first line body inner wall is electrically conductively connected to the second line body inner wall by means of at least one elastically deformable sliding contact of the device.

Surprisingly, it has been shown that, in the case of an embodiment according to the invention, a connection of fluid-conducting lines and/or chambers which disrupts the applied high-frequency electromagnetic fields to an especially small extent can be realized. Furthermore, the configuration according to the invention of the device also allows fluids to be transported through the inner cavity of the device, which the first line body inner wall and the second line body inner wall together enclose, with particularly low turbulence.

Devices according to the invention can be used wherever there is a need to connect fluid-conducting lines to one another or to connect a fluid-conducting line to a chamber or to connect fluid-conducting chambers to one another and respective high-frequency electromagnetic fields present there are to be disrupted as little as possible. Sources that generate the high-frequency electromagnetic fields may be arranged outside the lines and/or chambers. However, the high-frequency electromagnetic fields may also be produced in that the fluids conducted through the lines and/or chambers, whether liquids or gases, are themselves ionized or electrically charged. Devices according to the invention can thus be used in particular in particle accelerators. Other applications in which fluid-conducting lines and/or chambers must be connected to one another in a high-frequency electromagnetic field are also possible fields of use for devices according to the invention. Furthermore, the configuration according to the invention of the device also allows a certain degree of compensation of lengths and/or angles if the lines and/or chambers must be connected to one another or are already connected to one another. The need for compensation of lengths and/or angles by means of the device can arise when the lines and/or chambers are being assembled. However, the device according to the invention can also compensate for example temperature-related changes in lengths or angles of the lines and/or chambers in the already assembled state. The frequency spectra of the high-frequency electromagnetic fields can be very different in the various fields of application of the invention. It would also be possible to simply just refer to electromagnetic fields in general.

The use of the terms "first" and "second" in conjunction with the line bodies and their line body inner walls is a purely linguistic convention that serves for clear assignment. What is referred to as the first or second line body says nothing about the installation direction between two fluid-conducting lines and/or chambers or the flow direction of the fluids flowing through. In accordance with this convention, the line body inner wall of the first line body is referred to as the first line body inner wall. In accordance with this convention, the line body inner wall of the second line body is referred to as the second line body inner wall. In the case of the two line bodies, it can be the case that the line body inner wall is the only wall of the line body and is therefore at the same time also a line body outer wall. However, it may also be provided that one of the line bodies has an additional line body outer wall, as is also yet to be set out further below as a preferred configuration of the invention. In the case of the invention, the first line body inner wall of the first line body and the second line body inner wall of the second line body at any rate together enclose the inner cavity of the device, through which inner cavity the fluids are conducted. This inner cavity of the device and the interior space which is surrounded by the first line body inner wall and into which the second line body inner wall of the second line body projects a little overlap one another but are not identical. This is for two reasons. On the one hand, part of the second line body inner wall of the second line body and also the partial volume surrounded by the second line body inner wall are also located within the interior space surrounded by the first line body inner wall. On the other hand, the inner cavity of the device refers to the entire cavity of the device, through which cavity the fluids are transported when the device fluidically conductively connects the lines and/or chambers to one another.

The electrically deformable sliding contact between the first line body inner wall and the second line body inner wall has two tasks. Firstly, it is to electrically conductively connect these two line body inner walls to one another. Secondly, it is also to allow compensation of angles and/or lengths by virtue of tilting the two line body inner walls in relation to one another and/or pushing one line body inner wall inside the other or pulling them apart. For this purpose, it is provided that the sliding contact is on the one hand elastically deformable, but is on the other hand also as electrically conductive as possible. An encircling sliding contact that is intrinsically closed or in particular annular may be involved, but multiple sliding contacts arranged at a distance from one another may also be involved. In principle, all components that have sufficient elastic deformability and sufficient electrical conductivity are suitable for this. The sliding contact may, for example, have a connecting web, optionally intrinsically annularly closed, from which elastically deformable resilient limbs protrude on one side and/or on either side, wherein the resilient limbs electrically conductively connect the two line body inner walls to one another via the connecting web.

The bellows likewise has two tasks. Firstly, it serves to mechanically connect the first line body to the second line body. For this, the bellows favorably has an elastic pretension. However, plastically deformable bellows are also conceivable. In any case, the bellows make it possible to move the two line bodies relative to one another in order to compensate differences in length or incorrect angular positioning. For example temperature-related changes in lengths or angles between the interconnected lines and/or chambers can also be compensated in this way. If the bellows is elastically pretensioned, it is however the case as a result that the first line body and the second line body are favorably also pretensioned toward an initial position. The second task of the bellows is to seal the first line body and the second line body to the outside and accordingly to enclose them at least in certain regions. The bellows also favorably has an electrically conductive form. It particularly preferably consists of metal. In the corresponding configurations, in that case it forms an additional electrical connection between the first line body and the second line body.

The fluid-conducting lines and/or chambers to be connected to one another by means of the device according to the invention may have differently shaped opening cross sections. However, the lines may also be pipelines which, for example, have a circular opening cross section.

Preferred configurations of the invention provide that the at least one elastically deformable sliding contact lies against an outer side, facing away from the inner cavity, of the second line body inner wall and lies against an inner side, facing the inner cavity, of the first line body inner wall.

In order that the sliding contact maintains its intended position and is not unintentionally displaced, it is favorably provided that the sliding contact is arranged in a groove-shaped recess in the outer side, facing away from the inner cavity, of the second line body inner wall and/or in the inner side, facing the inner cavity, of the first line body inner wall. Being mounted in the groove-shaped recess prevents unintentional displacement of the sliding contact.

In the context of an aerodynamic design, all of the inner cavity for conducting fluid through the device favorably as far as possible has the same opening cross section. In order to achieve this, preferred variants of the invention provide that the first line body inner wall comprises two portions, wherein an opening cross section enclosed by the first line body inner wall is smaller in the first portion than in the second portion. Specifically, this makes it possible for the second line body inner wall of the second line body in the second portion of the first line body inner wall to project a little into the interior space surrounded by the first line body inner wall and end there. The second portion, which has a larger opening cross section than the first portion, creates a region in the first line body inner wall in which the second line body inner wall can be arranged by way of the piece with which it projects into the interior space of the first line body inner wall. This makes it possible for all of the inner cavity for conducting fluid through the device to have at least largely the same opening cross section in the two line bodies.

In preferred configurations of the invention, it may also be provided that the second line body comprises a line body outer wall, which is arranged at a distance from the second line body inner wall on that side of the second line body inner wall that faces away from the inner cavity, wherein the first line body inner wall projects into an intermediate space between the second line body inner wall and the line body outer wall and ends there. The distance between the line body outer wall and the second line body inner wall of the second line body is favorably large enough in this respect for the first line body inner wall, arranged in between, of the first line body to be movable relative to the second line body for the purpose of compensation of angles and/or lengths. In the sense of the device disrupting high-frequency electromagnetic fields as little as possible, it is expediently provided in this context for the first line body inner wall to be electrically conductively connected to the line body outer wall by means of at least one further elastically deformable sliding contact of the device.

In the sense of disrupting the high-frequency electromagnetic fields as little as possible, the components of the device according to the invention should have the highest possible electrical conductivity. In this context, it is preferably provided that the first line body and/or the second line body and/or the bellows and/or the sliding contact or the sliding contacts consist of a metal. Suitable metals are for example aluminum, steel, spring steel, copper and the like. As required, metal alloys with good conductivity may of course also be used correspondingly. A coating with silver and/or gold may also be provided. In any case, it is favorably provided that the first line body and/or the second line body and/or the bellows and/or the sliding contact or the sliding contacts has or have a DC electrical conductivity value of at least $1 \times 10^6$ siemens/meter, preferably of $10 \times 10^6$ siemens/meter.

In addition to the device according to the invention, the invention also relates to an arrangement having a first component, which is a line or a chamber, and a second component, which is a line or a chamber, wherein a high-frequency electromagnetic field is formed in and/or around the first component and the second component. This arrangement according to the invention is characterized in that the first component is fluidically conductively connected to the second component by means of a device according to the invention. In such arrangements, it is favorably provided that the first component and the second component are each connected to the device by means of a seal and an electrical sliding contact, wherein the seal is preferably surrounded by the electrical sliding contact.

BRIEF DESCRIPTION OF THE DRAWINGS

Further features and details of preferred configurations of the invention are explained by way of example in the following description of the figures, in which.

DETAILED DESCRIPTION

Figure 1:
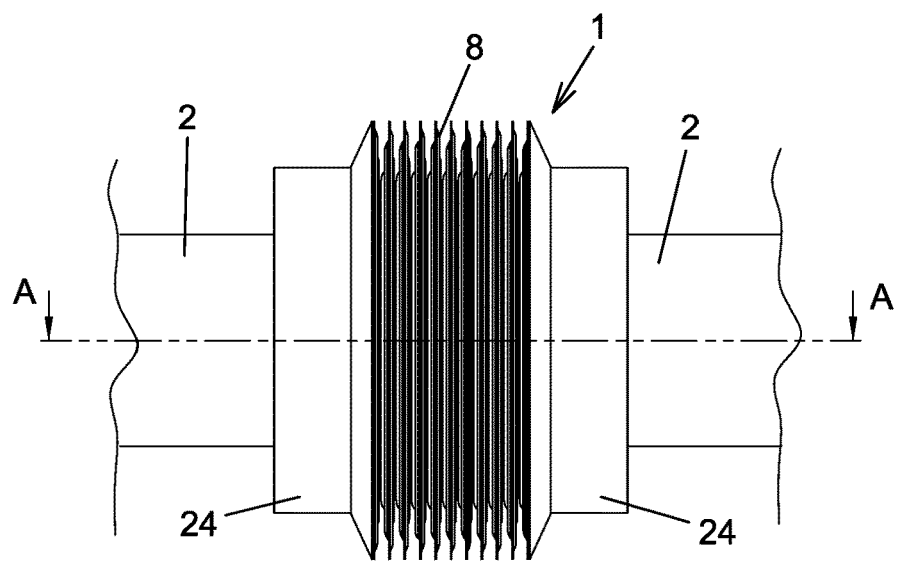
FIG. 1 shows a view from the outside of a connection of two fluid-conducting lines by means of an exemplary embodiment of a device according to the invention.

In FIG. 1, the two fluid-conducting lines 2 are fluidically conductively connected to one another by means of the device 1 according to the invention. In other words, fluids can thus flow from the one line 2 through the device 1 or through its inner cavity 9 into the other line 2, and vice versa. In the exemplary embodiment shown, the lines 2 each have a flange 24. The device 1 can be fastened by means of its line bodies 4 and 6 or their respective connection surfaces 25 to the respective flanges 24 in a manner known per se and not shown additionally here, e.g. by fixed screwing, welding, adhesive bonding, clamping and the like. Of course, it is also possible to dispense with flanges 24, with the result that the end faces of the respective lines 2 are fastened directly to the first line body 4 or to the second line body 6 or their connection surfaces 25.

Figure 2:
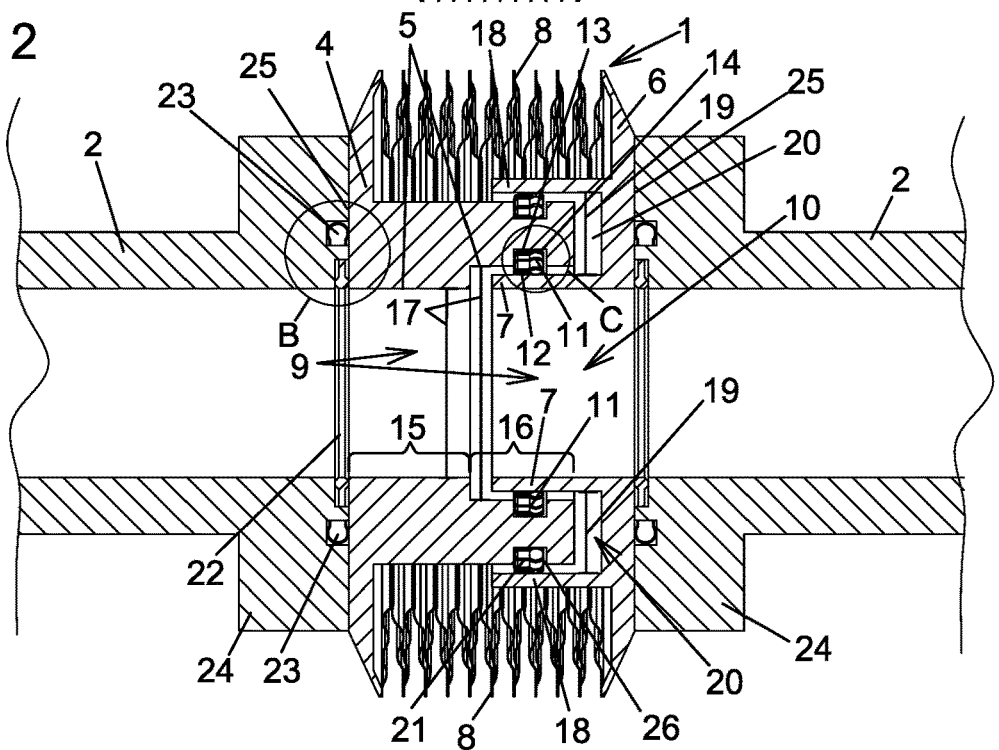
FIG. 2 is an enlargement of a longitudinal section along the sectional line A-A from FIG. 1.

FIG. 2 shows a slight enlargement of a longitudinal section along the sectional line A-A from FIG. 1. What is thus shown in FIG. 2 as also in FIG. 1 is an arrangement having a first component, in this instance a line 2, and a second component, in this instance the other line 2, wherein the first component is fluidically conductively connected to the second component by means of a device 1 according to the invention. With this connection, the device 1 according to the invention first of all allows a certain degree of compensation of deviations in lengths and/or angles of the lines 2 that face one another. In addition, the device 1 is designed according to the invention such that it disrupts a high-frequency electromagnetic field as little as possible or adversely affects it as little as possible. The sources of the high-frequency electromagnetic field, which are not shown here, may be arranged outside or inside the lines 2. Gaseous and/or liquid fluids with ionized or electrically charged particles can also flow through the lines 2 and the device 1.

It can be clearly seen in FIG. 2 that the device 1 comprises a first line body 4 and a second line body 6, which are connected to one another by means of a bellows 8, preferably an elastically deformable bellows, wherein at least in certain regions the bellows 8 encloses the first line body 4 and the second line body 6 and seals them to the outside. As explained in the introduction, the bellows 8 is favorably in the form of a metal bellows. It preferably has elastic properties. In this case, the two line bodies 4 and 6 are pretensioned relative to one another toward a neutral position by the elastic pretension of the bellows 8. However, they can also be deflected with respect to this neutral position, i.e. pushed one into another, pulled apart or pivoted in their angular position relative to one another, in order to compensate possible incorrect positioning between the two lines 2 to be connected to one another or a for example temperature-related expansion or contraction of the lines 2. It can also be clearly seen in FIG. 2 that the first line body 4 has a first line body inner wall 5, which is rigid per se, and the second line body 6 has a second line body inner wall 7, which is rigid per se. These two line body inner walls 5 and 7 together enclose the inner cavity 9 for the passage of fluid through the device 1. The first line body 4 and the second line body 6 can be displaced and/or tilted relative to one another, preferably counter to the elastic pretension of the bellows 8.

Primarily, however, it is also provided according to the invention that the second line body inner wall 7 of the second line body 6 projects a little into an interior space 10 surrounded by the first line body inner wall 5 and ends there. In addition, the first line body inner wall 5 is electrically conductively connected to the second line body inner wall 7 by means of the elastically deformable sliding contact 11. In other words, the two line bodies 4 and 6 are electrically shorted with one another via the sliding contact 11. By virtue of its elasticity, the sliding contact 11 permits a relative movement between the two line bodies 4 and 6 for the purpose of compensating lengths but also compensating angles.

As regards the relationship between the inner cavity 9 and the inner space 10, reference is made to the corresponding explanations further above. What was said there is readily comprehensible in FIG. 2.

It can also be clearly seen in FIG. 2 that the elastically deformable sliding contact 11 lies against the outer side 12, facing away from the inner cavity 9, of the second line body inner wall 7 and that the sliding contact 11 furthermore also lies against an inner side 13, facing the inner cavity 9, of the first line body inner wall 5. The groove-shaped recess 14, which is formed here in the first line body inner wall 5 of the first line body 4 and accommodates the sliding contact 11, prevents the sliding contact 11 from being undesirably displaced to an excessively great extent when lengths are compensated by pushing the two line bodies 4 and 6 together or pulling them apart or tilting is performed to compensate angles. It can also be clearly seen in FIG. 2 that the line body inner wall 5 has two portions 15 and 16 having opening cross sections 17 that differ from one another. The second portion 16, with the larger opening cross section, is that portion of the first line body inner wall 5 into which the second line body inner wall 7 projects a little and ends there. This stepped design of the opening cross section 17 of the first line body inner wall 5 makes it possible, as can be seen clearly in FIG. 2, to configure the inner cavity 9 with a constant opening cross section over substantially its entire extent or at least over broad parts of its extent in the device 1.

FIG. 2 also clearly shows that, in this exemplary embodiment, the second line body 6 has a line body outer wall 18 which is arranged at a distance 19 from the second line body inner wall 7 on that side of the second line body inner wall 7 that faces away from the inner cavity 9. The first line body inner wall 5 is arranged in this intermediate space 20 created by the distance 19 between the second line body inner wall 7 and the line body outer wall 18. It projects therein and ends there. This also serves to ensure that the device 1 according to the invention disrupts an external and/or internal high-frequency electromagnetic field as little as possible. In this context, it is also favorable if, as is also realized here, the first line body inner wall 5 is electrically conductively connected to the line body outer wall 18 by means of at least one further elastically deformable sliding contact 21 of the device 1.

Apart from the somewhat different dimensions, the further sliding contact 21 may have substantially exactly the same form as the sliding contact 11. The groove-shaped recess 26 in turn holds the sliding contact 21 in place and thus has the same function as the groove-shaped recess 14 for the sliding contact 11, see above. This applies to this exemplary embodiment, but can also be used in other variants of the invention.

To seal the connection between the respective line bodies 4 and 6 and the respective flange 24 or the respective line 2, a seal 22 is provided that is known per se and in this exemplary embodiment is in the form of an encircling ring. The seal 22 is in turn surrounded respectively by an electrical sliding contact 23. This electrical sliding contact 23 in turn serves to ensure the good electrical connection between the flanges 24 or lines 2 and the line bodies 4 and 6 of the device 1 according to the invention. The sliding contacts 23 could also be denoted connecting sliding contacts 23 for the purpose of linguistic differentiation. These sliding contacts 23 also favorably have an elastically deformable form per se. Apart from their dimensioning, these sliding contacts 23 may also be configured substantially like the sliding contacts 11.

Figure 3:
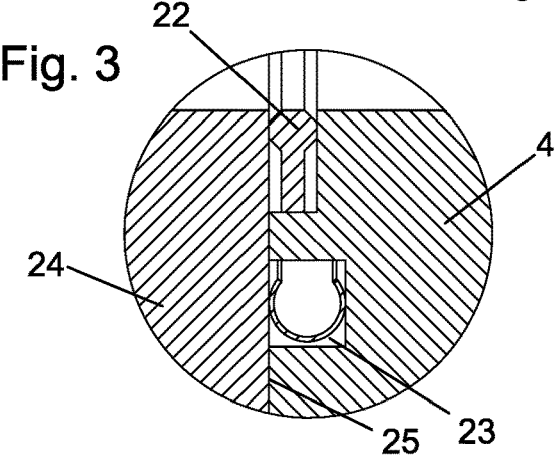
FIG. 3 is an enlargement of the detail B from FIG. 2.
Figure 4:
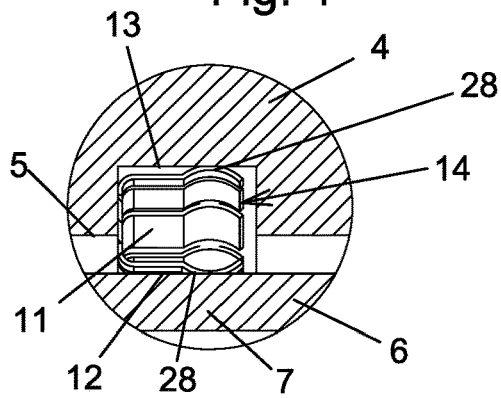
FIG. 4 is an enlargement of the detail C from FIG. 2.

FIG. 3 shows an enlargement of the detail B from FIG. 2 in the region of the seal 22 and the sliding contact 23. FIG. 4 shows an enlargement of the region C from FIG. 2. In these figures, it can be clearly seen how the electrical sliding contact 11 lies against the inner side 13 of the first line body inner wall 5 on one side and against the outer side 12 of the second line body inner wall 7 on the other side in order to electrically conductively but also elastically adjustably connect these two line body inner walls 5 and 7 to one another.

Figure 5:
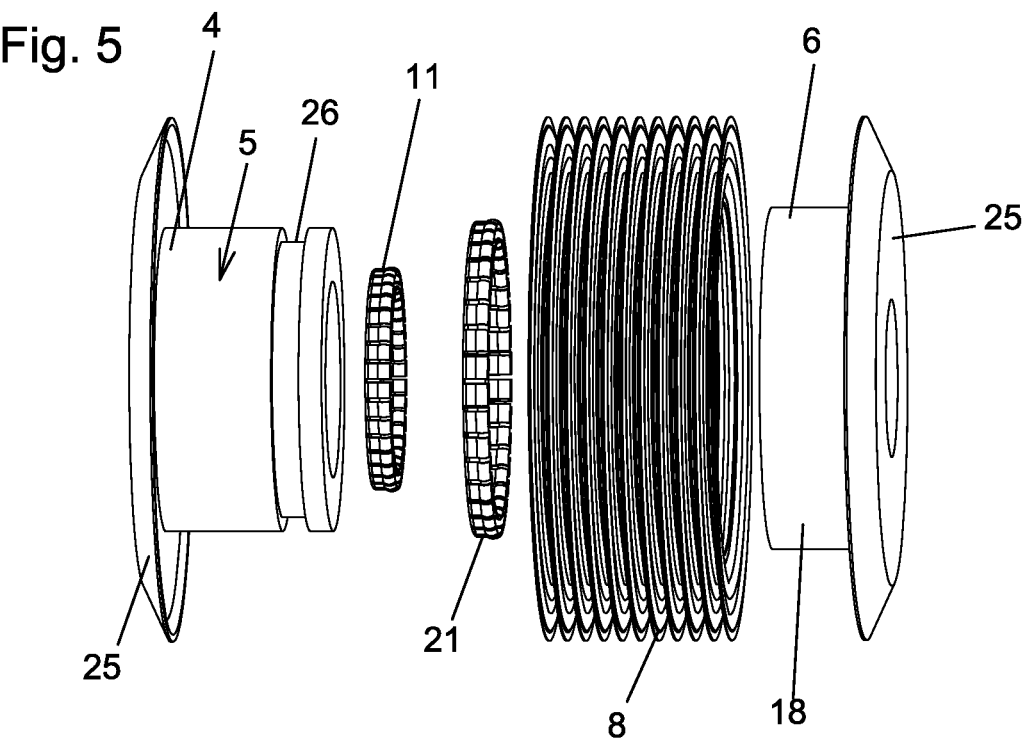
FIG. 5 shows the device according to the invention of this exemplary embodiment according to the invention in an exploded illustration.
Figure 6:
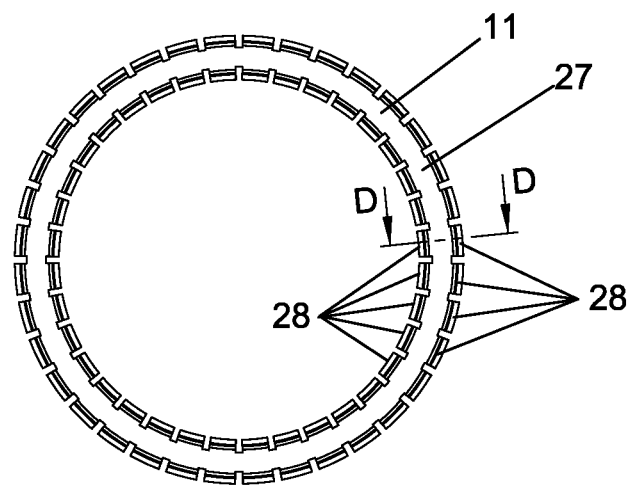
FIG. 6 shows a sliding contact used in this exemplary embodiment.
Figure 7:
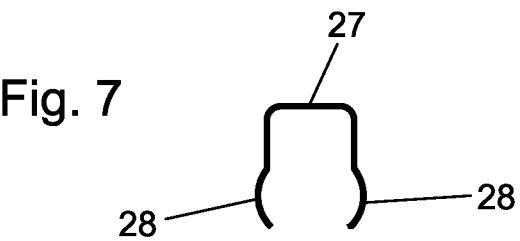
FIG. 7 shows a section through the sliding contact along the sectional line D-D from FIG. 6.

FIG. 5 shows the individual components of the exemplary embodiment of the device 1 according to the invention in an exploded illustration. The sliding contact 11, configured here as an intrinsically closed ring, is illustrated separately in FIG. 6. In conjunction with FIG. 6, it can be seen particularly well in FIG. 7, which shows the section D-D along the sectional line from FIG. 6, how the annular connecting web 27 of the sliding contact 11 on either side has a respective sequence of resilient limbs 28 which can each be elastically deflected relative to the connecting web 27. By means of the resilient limbs 28, the sliding contact 11 lies against the first line body inner wall 5 on one side and against the second line body inner wall 7 on the other side.

As has already been set out, the sliding contacts 21 and 23 may have a corresponding form. However, other elastically deformable sliding contacts with good electrical conductivity may also be used. Primarily, it is also not imperatively necessary for the sliding contacts 11 to be in the form of an intrinsically closed ring. There could also be multiple sliding contacts 11 which are spaced apart and separate from one another, in order to allow the electrically highly conductive connection on the one hand and the elastic mounting of the two line bodies 4 and 6 relative to one another on the other hand, but also the corresponding connection between the line bodies 4 and the lines 2.

Figure 8:
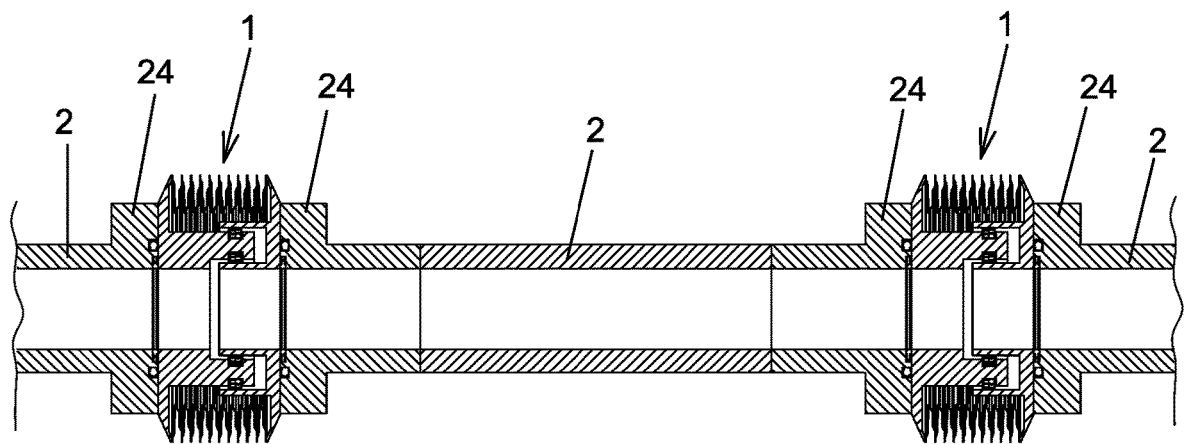
FIG. 8 shows a longitudinal section through a connection of multiple fluid-conducting lines, arranged one behind the other, by means of devices according to the invention.

In a corresponding longitudinal section, FIG. 8 shows by way of example how a total of three lines 2 are fluidically conductively connected to one another by means of two devices 1 according to the invention of the exemplary embodiment shown here.

Figure 9:
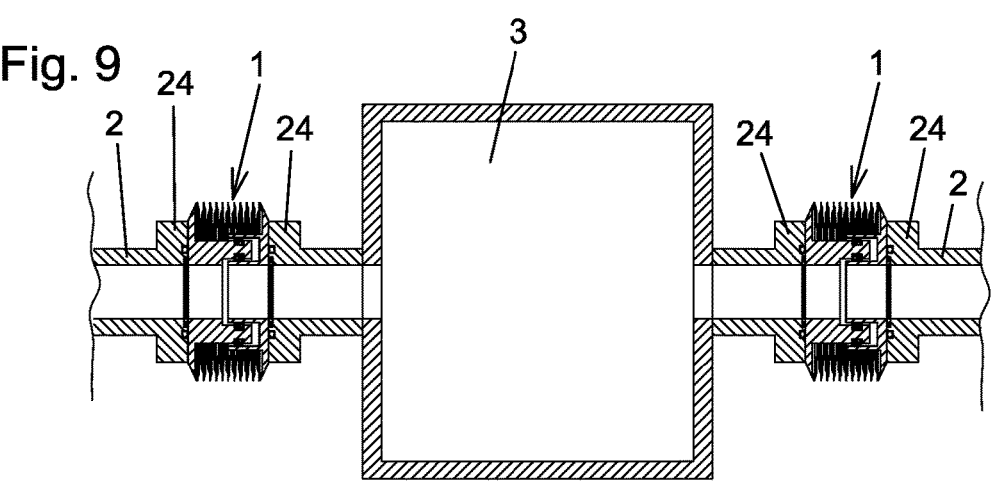
FIG. 9 shows a longitudinal section through a connection of fluid-conducting lines to a chamber by means of devices according to the invention, likewise in a longitudinal section.

FIG. 9 shows an example in which a centrally arranged chamber 3 is connected to two lines 2 with the interposition of respective devices 1 according to the invention. Of course, it is also possible for two chambers 3 to be directly connected to one another correspondingly.

KEY TO THE REFERENCE SIGNS

1 Device
2 Line
3 Chamber
4 First line body
5 First line body inner wall
6 Second line body
7 Second line body inner wall
8 Bellows
9 Inner cavity
10 Interior space
11 Sliding contact
12 Outer side
13 Inner side
14 Groove-shaped recess
15 First portion
16 Second portion
17 Opening cross section
18 Line body outer wall
19 Distance
20 Intermediate space
21 Further sliding contact
22 Seal
23 Sliding contact
24 Flange
25 Connection surface
26 Groove-shaped recess
27 Connecting web
28 Resilient limb

The invention claimed is:

1. A device for connecting at least one of fluid-conducting lines or chambers in a high-frequency electromagnetic field, the device comprising:
   a first line body with a first line body inner wall;
   a second line body with a second line body inner wall;
   a bellows that connects the first line body to the second line body;
   the first line body inner wall and the second line body inner wall together enclose an inner cavity for passage of fluid through the device;
   at least in certain regions the bellows encloses the first line body and the second line body with a sealing action toward outside;
   the first line body and the second line body are at least one of displaceable or tiltable relative to one another;

the second line body inner wall of the second line body projects into an interior space surrounded by the first line body inner wall and ends there;

the first line body inner wall is electrically conductively connected to the second line body inner wall by at least one elastically deformable sliding contact; and the second line body comprises a line body outer wall, which is arranged at a distance from the second line body inner wall on that side of the second line body inner wall that faces away from the inner cavity, and the first line body inner wall projects into an intermediate space between the second line body inner wall and the line body outer wall and ends there.

2. The device as claimed in claim 1, wherein the at least one elastically deformable sliding contact lies against an outer side, facing away from the inner cavity, of the second line body inner wall and lies against an inner side, facing the inner cavity, of the first line body inner wall.

3. The device as claimed in claim 2, wherein the sliding contact is arranged in a groove-shaped recess in the outer side, facing away from the inner cavity, of the second line body inner wall.

4. The device as claimed in claim 1, wherein the first line body inner wall comprises two portions, and an opening cross section enclosed by the first line body inner wall is smaller in the first portion than in the second portion.

5. The device as claimed in claim 4, wherein the second line body inner wall of the second line body in the second portion of the first line body inner wall projects into the interior space surrounded by the first line body inner wall and ends there.

6. The device as claimed in claim 1, wherein the first line body inner wall is electrically conductively connected to the line body outer wall by at least one additional elastically deformable sliding contact.

7. The device as claimed in claim 1, wherein at least one of the first line body, the second line body, the bellows, or the at least one sliding contact comprises a metal.

8. An arrangement comprising a first component, which is a line or a chamber, and a second component, which is a line or a chamber, wherein a high-frequency electromagnetic field is formed at least one of in or around the first component and the second component, and the first component is fluidically conductively connected to the second component by the device as claimed in claim 1.

9. The arrangement as claimed in claim 8, wherein the first component and the second component are each connected to the device by a seal and an electrical sliding contact, and the seal is surrounded by the electrical sliding contact.

10. The device as claimed in claim 1, wherein the bellows is elastically deformable.

11. The device as claimed in claim 2, wherein the sliding contact is arranged in a groove-shaped recess in the inner side, facing the inner cavity, of the first line body inner wall.

12. The device as claimed in claim 1, wherein at least one of the first line body, the second line body, the bellows, or the at least one sliding contact has a DC electrical conductivity value of at least $1 \times 10^6$ siemens/meter.

* * * * *